United States Patent [19]

Morita et al.

[11] Patent Number: 4,845,403
[45] Date of Patent: Jul. 4, 1989

[54] PROJECTION TYPE COLOR PICTURE DISPLAY SYSTEM HAVING GREEN PICTURE AND BLUE PICTURE PRODUCING CRTS WITH γ COEFFICIENTS

[75] Inventors: Yasukazu Morita, Mobara; Yasuhiko Uehara, Chiba; Hidetsugu Matsukiyao, Koganei; Hajime Yamamoto, Tokyo, all of Japan; Shuji Inaho, Flanders, N.J.; Takashi Hase, Ebina; Shinji Yokota, Isehara, both of Japan

[73] Assignees: Hitachi, Ltd.; Kasei Optonix Ltd., both of Tokyo, Japan

[21] Appl. No.: 27,873

[22] Filed: Mar. 19, 1987

[30] Foreign Application Priority Data

Mar. 19, 1986 [JP] Japan .................................. 61-59231

[51] Int. Cl.$^4$ ............................................. H01J 29/20
[52] U.S. Cl. ..................................... 313/468; 313/461
[58] Field of Search ....................... 313/461, 467, 468; 252/301.4 S, 301.6 S, 301.4 R

[56] References Cited

U.S. PATENT DOCUMENTS 4,140,940 2/1979 Uehara et al. ..................... 313/467
4,533,850 8/1985 Ohkoshi et al. ................ 313/461 X
4,683,398 7/1987 Vriens et al. ......................... 313/474

OTHER PUBLICATIONS

Inter-University Electronics Series, vol. 5, Luxenberg et al., "Display Engineering (Trans.)", pp. 304 & 305, 8/68, McGraw-Hill, Inc.
Toshiba Review, vol. 35, No. 7, "CRT—Progress of CRT for Display", pp. 598, 603 & 604, 1/80.
Hitachi, Ltd., Uehara et al., "Calcium Sulfide Phosphors for Projection Tubes", pp. 13–17, 3/71.

*Primary Examiner*—Kenneth Wieder
*Attorney, Agent, or Firm*—Antonelli, Terry & Wands

[57] ABSTRACT

In a projection type color picture display system having red, green and blue picture producing cathode-ray tubes in which the green picture producing cathode-ray tube is capable of emitting green light defined as $x \lesssim 0.330$ and $y \gtrsim 0.570$ in the CIE chromaticity diagram, use is made of a ZnS: Ag, Al phosphor material for forming the phosphor screen of the blue picture producing cathode-ray tube. The projection type display system thus obtained is capable of displaying color pictures with a high color purity and a high saturation.

8 Claims, 3 Drawing Sheets

PROJECTION TYPE COLOR PICTURE DISPLAY SYSTEM HAVING GREEN PICTURE AND BLUE PICTURE PRODUCING CRTS WITH γ COEFFICIENTS

BACKGROUND OF THE INVENTION

The present invention relates to a projection type color picture display system, and in particular to a projection type color picture display system for reproducing color television broadcast pictures, information including pictures recorded on a video camera or a VTR and for displaying the information thus reproduced on a large screen.

As an example of the projection type color picture display system, a projection type color television picture display system is shown in FIGS. 1A and 1B. FIG. 1A schematically shows the structure of the system. FIG. 1B schematically shows the optical arrangement of the optical system and the screen of the color television picture display system.

In a projection type color picture display system, the highly bright picture formed on the phosphor screens of cathode-ray tubes $CRT_1$ to $CRT_3$ is enlargedly projected onto a screen (a transmission type screen having a Fresnel lens FL, for example) S via an optical system including projection lenses $L_1$ to $L_3$ and reflex mirrors $M_1$ and $M_2$. In a projection type cathode-ray tube used in this system, therefore, the phosphor screen is loaded with electron beam energy, which is not less than ten times that of a conventional picture tube, i.e., a direct-view cathode-ray tube, in order to enhance the brightness on the screen S as much as possible. When a white pattern is reproduced on the projection screen, approximately 70% of the brightness is occupied by the green color.

In green picture producing cathode-ray tubes used in conventional projection type color picture display system, a phosphor material of manganese activated zinc silicate ($Zn_2SiO_4$:Mn) phosphor material producing a high color purity, a phosphor material of terbium activated gadolinium oxysulfide (a $Gd_2O_2S$:Tb phosphor material), a phosphor material of terbium activated yttrium silicate (a $Y_2SiO_5$:Tb phosphor material), a phosphor material of terbium activated yttrium aluminate (a $Y_2Al_5O_{12}$:Tb phosphor material), a mixed phosphor material composed of the phosphor material of yttrium aluminate and the above described phosphor material of manganese activated zinc silicate or the like were used. However, the phosphor material of manganese activated zinc silicate is not suitable for practical use since it causes long persistence and deterioration of the brightness due to the electron beam. Further, various terbium-activated phosphor materials have drawbacks of poor color purity although they are generally used for projection type cathode-ray tubes as described in Technical Report published by the Institute of Television Engineers of Japan, March 18, 1982, pp. 13–17, IPD 66-3, for example.

The projection type color picture display system composed of a cathode-ray tube (CRT) using such a green light emitting phosphor having a poor color purity is not only poor in green color purity but also unadvantageously narrow in color reproduction range of picture.

SUMMARY OF THE INVENTION

An object of the present invention is to provide a blue picture producing cathode-ray tube for realizing a projection type color picture display system having a high color purity. The "color purity" means not only the purity of colors of the reproduced pictures, but also the degree of the saturation of the colors.

Another object of the present invention is to provide a projection type color picture display system having a high color purity in green and an expanded color reproduction range of color picture as compared with the prior art.

In accordance with the present invention, the color purity of the green component of the picture displayed by a projection type color picture display system is at first improved by using a green picture producing (green light emitting) CRT having a phosphor screen composed of a green light emitting phosphor capable of emitting green light belonging to a region defined as $x \lesssim 0.330$ and $y \gtrsim 0.570$ in the CIE chromaticity diagram. This green light emitting phosphor having a high color purity has, however, involves some problems as described below.

In accordance with an embodiment of the present invention, a green picture producing CRT employing as an example of the above described green light emitting phosphor having a high color purity a phosphor material of terbium activated indium borate (an $InBO_3$:Tb phosphor material) which has been known previously but is not generally used yet. The γ coefficient in the beam current-brightness characteristic curve of this $InBO_3$:Tb phosphor material is approximately 0.9. When this green picture producing CRT having a high color purity is combined with the conventional red picture producing CRT and the conventional blue picture producing CRT to constitute a projection type color picture display system, it is necessary to make the beam current value of the blue picture producing CRT large for obtaining a white color and in particular a white color of high brightness. In general, the phosphor material used in the blue picture producing CRT is a phosphor material of silver activated zinc sulfide (a ZnS:Ag phosphor material). This phosphor material has a low γ coefficient 0.61 in the beam current-brightness characteristic curve. This results in a problem that the brightness is not so raised even if the beam current is increased. A very large current thus becomes necessary for obtaining a white color of high brightness by combining the phosphor material of silver activated zinc sulfide with a green light emitting phosphor material having a high color purity. The γ coefficient is a value of γ defined by $$Lo = aI_k^\gamma + b$$

where
$I_k$: density of beam current for exciting the phosphor material
a, b: constants
γ: coefficient
Lo: brightness of the light emitted by the phosphor material when $I_k$ is supplied thereto.

In case of a cathode-ray tube used in a projection type color picture display system, it generally holds true that $2.0\ (\mu A/cm^2) \lesssim I_k \gtrsim 10.0 (\mu A/cm^2)$ For solving the problem relating to the blue light emitting phosphor material while using the above described green picture producing CRT having a high color purity, therefore, it is necessary to use a blue light emitting phosphor material having less brightness saturation in the current-brightness characteristic curve, i.e., a better brightness linearity with respect to the current value or a larger $\gamma$ coefficient as compared with the conventional phosphor material of silver-activated zinc sulfide. The present inventors searched for a blue light emitting phosphor material having a good linearity in many ways. As a result, it has been found that a phosphor material of silver and aluminum co-activated zinc sulfide (ZnS:Ag, Al) has a large $\gamma$ coefficient. In particular, it has been found that a specific phosphor material of silver and aluminum co-activated zinc sulfide (a Zns: Ag, Al material) with the Ag content with respect to unit gram of ZnS not less than about 500 $\mu g/g$ and the Al content with respect to unit gram of ZnS not less than about 250 $\mu g/g$ has an extremely high linearity ($\gamma \gtrsim 0.65$) as compared with the conventional phosphor material of silver activated zinc sulfide. When the Ag content is less than about 500 $\mu g/g$ or the Al content is less than about 250 $\mu g/g$, the $\gamma$ coefficient becomes less than 0.65, with the above-described problem being posed seriously in practical use.

By fabricating a three-tube projection type color picture display system composed of a combination of a blue picture producing CRT using the above described phosphor material of silver and aluminum co-activated zinc sulfide ($\gamma = 0.68$, for example), a green picture producing CRT using the above described green light emitting phosphor material having a high color purity such as a phosphor material of terbium activated indium borate, and a conventional red picture producing CRT, it is possible to obtain a projection type color picture display system which is free from the above described problem of the prior art and which has a high color purity and a wide color reproduction range. In the CIE chromaticity diagram, the color of the light emitted by the above described ZnS:Ag, Al phosphor material belongs to the color region of the light emitted by the conventional blue light emitting phosphor material (e.g., $0.14 \lesssim x \lesssim 0.16$ and $0.05 \lesssim y \lesssim 0.08$).

In accordance with one aspect of the present invention, the projection type color picture display system comprises a green picture producing CRT having a phosphor screen composed of a green light emitting phosphor material which is fine in color purity and saturation and a blue picture producing CRT having a phosphor screen composed of a phosphor material having comparatively less saturation in the current-brightness characteristics. Hence this projection type color picture display system is capable of displaying clearly as far as the highly bright white portion with a favorable color purity.

DESCRIPTION OF THE PREFERRED EMBODIMENTS

Embodiment 1

Figure 1A:
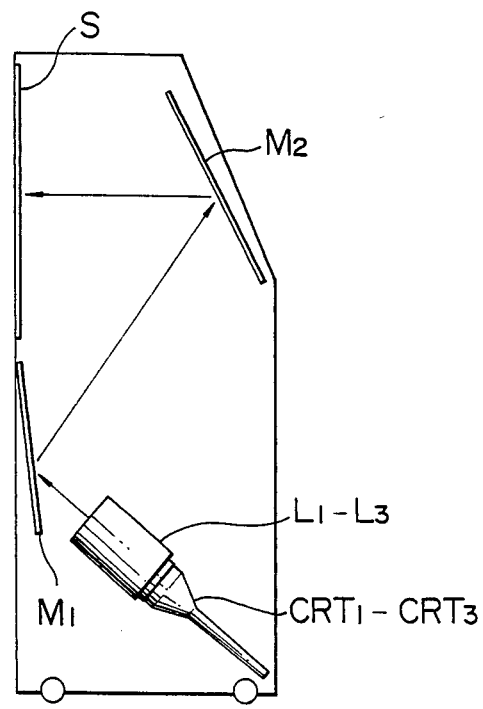
FIGS. 1A and 1B are schematic views of a projection type color picture display system.
Figure 1B:
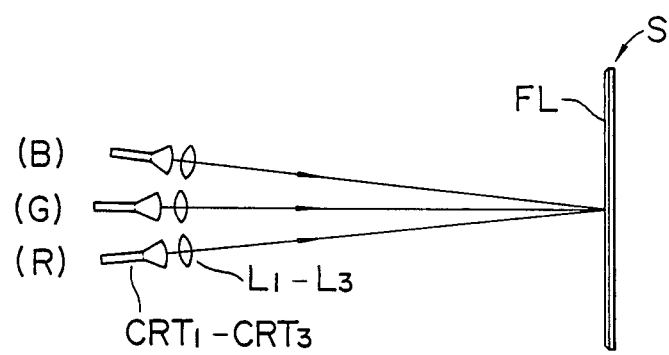

A 7 inch-type green picture producing CRT having a phosphor screen composed of a phosphor material of terbium activated indium borate was combined with a 7 inch-type blue picture producing CRT having a phosphor screen composed of a phosphor material of silver and aluminum co-activated zinc sulfide having a Ag content of 1000 $\mu g/g$ and an Al content of 500 $\mu g/g$ and being in a hexagonal system (2.5 wt %) and in a cubic system (97.5 wt %) thereby to provide $\gamma = 0.68$ and a 7 inch-type red picture producing CRT having a phosphor screen composed of a phosphor material of europium activated yttrium oxide (a $Y_2O_3$:Eu phosphor material). The resulting projection type color picture display system as shown in FIGS. 1A and 1B has a high blue color purity and a color reproduction range widened as compared with the prior art.

Figure 2:
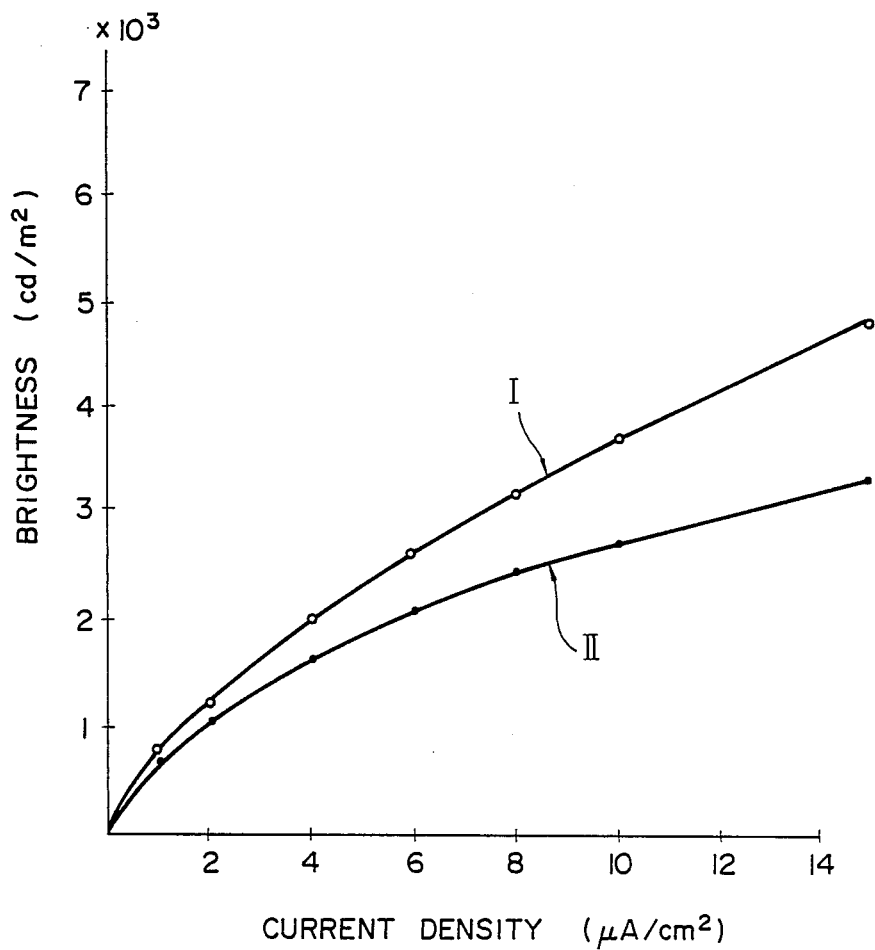
FIG. 2 shows the relationship between the current density ($\mu A/cm^2$) and the brightness ($cd/m^2$) an embodiment of a blue picture producing CRT according to the present invention.

FIG. 2 shows the relationship between the current density ($\mu A/cm^2$) and the brightness ($cd/m^2$) of a blue picture producing CRT. A curve I of FIG. 2 represents the characteristics of the blue color picture producing CRT used for the present embodiment and a curve II represents the characteristics of a conventional blue color picture producing CRT. These data were measured in a 7 inch-type CRT under the condition that the beam acceleration voltage Eb is 30 kV. As evident from FIG. 2, the brightness of the blue light emitting CRT according to the present embodiment is hard to be saturated with respect to the current density and hence has a favorable linearity. Especially in a high current region where the peak current $\geq 1$ mA ($\geq 10$ $\mu A/cm^2$ for a 7-inch to 4-inch CRT), the current value of the blue picture producing CRT according to the present embodiment required to yield the same brightness is less than that of the conventional blue picture producing CRT by as much as 30%. The current values of respective color picture display systems required for obtaining a specific white color (typically 9300° K. +27 MPCD) are shown in Table 1 together.

TABLE 1

| Kind of System | Current Value Exciting current for obtaining white color (9300° K. + 27 MPCD) (Exciting current in green picture producing CRT is fixed constant.) | | |
|---|---|---|---|
| | Blue picture producing CRT | Green picture producing CRT | Red picture producing CRT |
| Conventional system | 320 $\mu A$ | 420 $\mu A$ | 260 $\mu A$ |
| System having a favorable color purity only in green | 370 $\mu A$ | 420 $\mu A$ | 340 $\mu A$ |
| System according to the present embodiment | 330 $\mu A$ | 420 $\mu A$ | 320 $\mu A$ |

As evident from Table 1, the current value of the blue picture producing CRT becomes large in a color picture display system composed of a combination of a conventional blue picture producing CRT and a green picture producing CRT having a favorable color purity. If a blue picture producing CRT having less brightness saturation and a green picture producing CRT having a favorable color purity are used in a combination in accordance with the present embodiment, however, the current value of the blue picture producing CRT becomes nearly equal to that of the conventional system.

Figure 3:
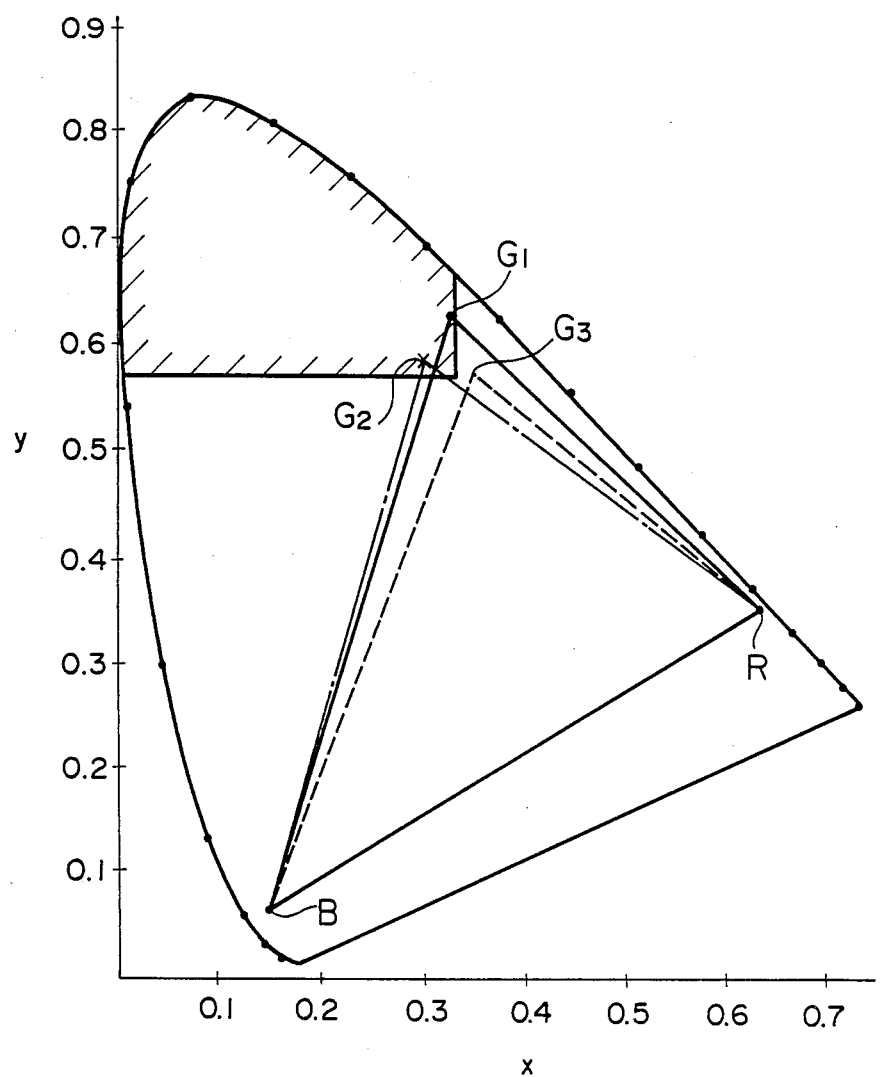
FIG. 3 shows the color reproduction ranges of an embodiment of a system according to the present invention, a conventional projection type color picture display system and a conventional direct-view picture tube on the CIE chromaticity coordinates.

FIG. 3 shows the color reproduction range of the system according to the present embodiment on the CIE chromaticity diagram. For the purpose of comparison, the color reproduction ranges of a conventional system and a direct-view CRT are also shown.

The color reproduction range of a projection type color picture display system generally used heretofore and composed of green, blue and red picture producing CRT's is represented by a triangle $G_3BR$ bounded by broken lines. Vertexes $G_3$, B and R of the triangle represent colors of the light emitted by phosphor materials for the three primary colors, respectively. The color reproduction range of a direct-view color picture tube is represented by a triangle $G_2BR$ bounded by broken lines. The direct-view color picture tube has a larger triangle area and hence a larger color reproduction range. A larger triangle area thus means a larger color reproduction range.

The color reproduction range of the projection type color picture display system according to the present embodiment is inside a triangle $G_1BR$ surrounded by solid lines. That is to say, the color reproduction range of the present embodiment system is larger than that of a conventional projection type color picture display system and is also larger than that of the direct-view picture tube. The color of the light emitted by the green picture producing CRT used according to the present invention belongs to a region defined as $x \lesssim 0.330$ and $y \gtrsim 0.570$ on the CIE chromaticity coordinates as described above.

Embodiment 2

The phosphor material of the red picture producing CRT in the embodiment 1 was replaced by a phosphor material of europium-activated yttrium oxysulfide (a $Y_2O_2S$:Eu phosphor material). As compared with the conventional system in the same way as the comparison of the embodiment 1 with the conventional system shown in FIGS. 2 and 3 as well as Table 1, the resultant projection type color picture display system also has a favorable green color purity and a larger color reproduction range.

As described above, the present invention widens the color reproduction range as compared with the conventional system, improves the green color purity, and prevents the quality degradation or reliability loss due to burning or glass coloring by keeping the operative current value of the blue picture producing CRT nearly equal to that of the conventional case.

We claim:

1. A projection type color picture display system comprising at least a green picture producing cathode-ray tube and a blue picture producing cathode-ray tube, the green picture producing cathode-ray tube having a phosphor screen made of an $InBO_3$:Tb phosphor material and being capable of emitting green light defined as $x \lesssim 0.330$ and $y \lesssim 0.570$ in the CIE chromaticity diagram, the blue picture producing cathode-ray tube having a phosphor screen for producing thereon a picture in blue in which said phosphor screen is made of a ZnS: Ag, Al phosphor material having a $\gamma$ coefficient in a beam current-brightness characteristic curve no less than about 0.65, wherein the projection type color picture display system has high color purity.

2. A projection type color picture display system according to claim 1, in which Ag content and Al content in said ZnS:Ag, Al phosphor material are no less than about 500 $\mu g/g$ and no less than about 250 $\mu g/g$, respectively.

3. A projection type color picture display system comprising a red picture producing cathode-ray tube, a green picture producing cathode-ray tube and a blue picture producing cathode-ray tube, in which said green picture producing cathode-ray tube has a phosphor screen made of an $InBO_3$:Tb phosphor material and is capable of emitting green light defined as $x \lesssim 0.330$ and $y \gtrsim 0.570$ in the CIE chromaticity diagram, and the blue picture producing cathode-ray tube has a phosphor screen for producing thereon a picture in blue wherein said phosphor screen is made of a ZnA:Ag, Al phosphor material having a $\gamma$ coefficient in a beam current-brightness characteristic curve no less than about 0.65, wherein the projection type color picture display system has high color purity.

4. A projection type color picture display system according to claim 3, in which the Ag content and Al content in said ZnS: Ag, Al phosphor material are no less than about 500 $\mu g/g$ and no less than about 250 $\mu g/g$, respectively.

5. A projection type color picture display system according to claim 1, in which the green picture producing cathode-ray tube has a $\gamma$ coefficient in the beam current-brightness characteristic curve no less than about 0.65.

6. A projection type color picture display system according to claim 5, in which the $\gamma$ coefficient of the green picture producing cathode-ray tube is about 0.9.

7. A projection type color picture display system according to claim 3, in which the green picture producing cathode-ray tube has a $\gamma$ coefficient in the beam current-brightness characteristic curve no less than about 0.65.

8. A projection type color picture display system according to claim 7, in which the $\gamma$ coefficient of the green picture producing cathode-ray tube is about 0.9.

* * * * *